United States Patent

[11] 3,554,458

| [72] | Inventor | Melvin William Smith |
| | | Altaloma, Calif. |
| [21] | Appl. No. | 672,279 |
| [22] | Filed | Oct. 2, 1967 |
| [45] | Patented | Jan. 12, 1971 |
| [73] | Assignee | The Gracia Corporation |
| | | a corporation of New Jersey |

[54] SPINNING REEL
11 Claims, 7 Drawing Figs.

[52] U.S. Cl. .................................................. 242/84.2
[51] Int. Cl. ........................................... A01k 89/00
[50] Field of Search ........................................ 242/84.2,
84.2(A), 84.2(B), 84.2(E), 84.2(F), 84.2(H),
84.2(I), 84.21, 84.21(A), 84.21(W)

[56] References Cited
UNITED STATES PATENTS

| 2,753,130 | 7/1956 | Sjogren | 242/84.21 |
| 3,089,663 | 5/1963 | Kirby | 242/84.2X |

FOREIGN PATENTS

| 265,430 | 3/1950 | Switzerland | 242/84.21 |

Primary Examiner—Billy S. Taylor
Attorney—J. Bradley Cohn

ABSTRACT: A spinning reel having a drum with a bail thereon and having a line spool, the reel having means to selectively rotate said drum and bail while maintaining said spool against rotation and to rotate said line spool while maintaining said drum and bail against rotation.

INVENTOR:
MELVIN W. SMITH
BY Bradley Cohn
ATTORNEY

PATENTED JAN 12 1971

INVENTOR:
MELVIN W. SMITH
BY Bradley Cohn
ATTORNEY

SPINNING REEL

BACKGROUND OF THE INVENTION

In a fishing reel of the type known as a spinning reel, during casting or otherwise, line is drawn off over the flange of a spool which is fixed against rotation. During rewinding, a drum with a bail is rotated about the spool to deposit line thereon. Thus when line is drawn off the spool as when casting, a twist of one revolution is imparted to the line for each turn drawn off. This extended and twisted line will tend to untwist in the water. As line is rewound, a reverse twist in the other direction is imparted to it. When fishing is good and a fish is reeled in, this twist cannot unwind during reeling in and the resulting twisted line wound on the spool may subsequently tend to foul. On other occasions, as when first winding new line on a spinning reel spool, it is desirable not to impart a twist to the new line.

SUMMARY OF THE INVENTION

This invention prevents twisting of line being wound on a spinning reel spool by providing means to selectively rotate the spool and not the drum and bail to wind line on the spool. Otherwise, the spinning reel of this invention may be used in a conventional manner. A single control shift lever is moved to lock the spool against rotation and allow the drum and bail to be rotated and is moved to lock the drum and bail against rotation and allow the line spool to be rotated. This invention provides a spinning reel with greater versatility and resulting advantages without any increase in weight or size.

DESCRIPTION OF THE PREFERRED EMBODIMENT

Figure 1:
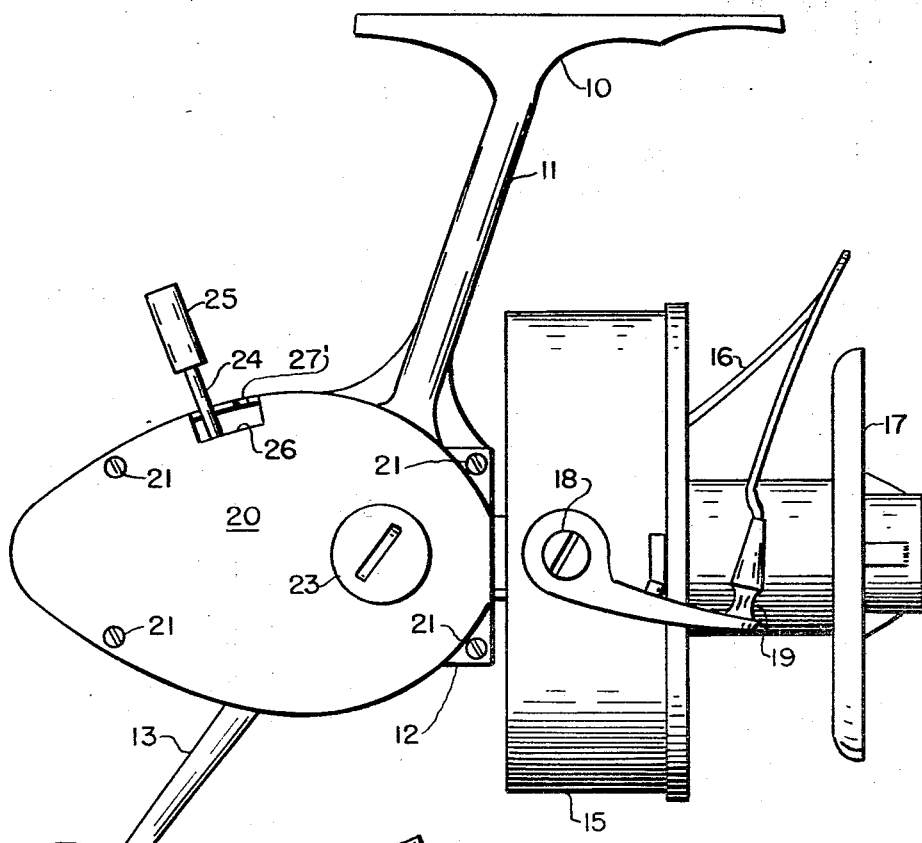
FIG. 1 is a side view of a reel according to this invention.

FIG. 1 shows a spinning reel according to this invention. This reel has a conventional foot 10 for attachment below a rod (now shown), a post or stalk 11 which supports a drive housing 12, a crank 13 with a handle 14, a drum 15 carrying a bail 16, and a line spool 17. The bail 16, as in conventional spinning reels, pivots about the axis of the screw 18 from a free position to the line engaging position shown. As shown, line passes from spool 17 about the line guide groove 19 to extend to the right. Conventional clickers, line tension devices, clutches, and the like (not shown) may be incorporated in the reel of this invention. All the elements so far described are conventional and may be as shown or in any other form.

Figure 2:
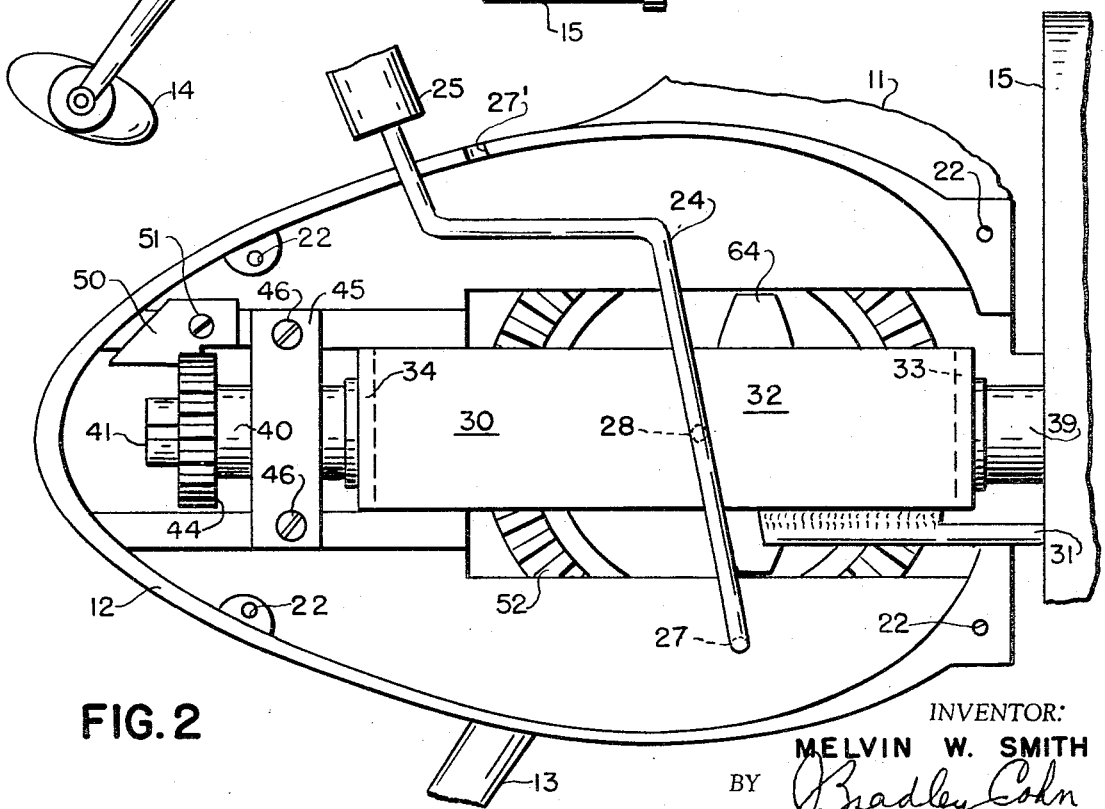
FIG. 2 is a side view of the broken away body of the drive housing of the reel of FIG. 1 with the side cover plate removed.

FIG. 2 shows the cover plate 20 of FIG. 1 removed. Cover plate 20 is secured to drive housing 12 by four screws 21 which are screwed into the threaded apertures 22. An easily removed lubrication plug 23 may be provided in plate 20.

As may be seen in FIGS. 1 and 2, a shift lever 24 having a handle 25 extends through a cut out portion 26 of cover 20. Detent notches 27' in drive housing 12 hold shift lever 24 in a rear position as shown or in a forward position. Shift lever 24 is of wire and has a lower inwardly bent end 27 which seats in an aperture in drive housing 12 so that lever 24 is pivotally secured by lower end 27. A central inward projection 28 is welded to lever 24 to enter an aperture 29 in shift yoke 30. Thus forward motion of handle 25 moves shift yoke 30 forward from the position shown in FIG. 2.

Figure 4:
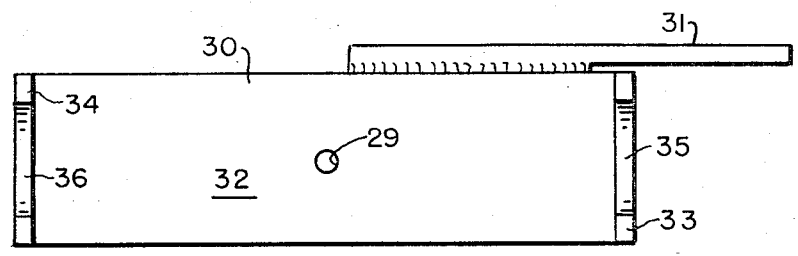
FIG. 4 is a side view of the reverse or inner side of a shift yoke used in the reel of this invention.

FIG. 4 shows the configuration of shift yoke 30. A drum locking bolt 31 is welded to extend forward from the body 32 of shift yoke 30. Forward and rearward inturned flanges 33 and 34 have semicircular notches 35 and 36 cut in their inwardly facing ends. These notches 35 and 36 seat, respectively, in and partially about the annular grooves 37 and 38 of the tubular shafts 39 and 40 shown in FIG. 5.

Figure 6:
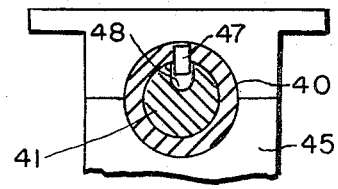
FIG. 6 is a section taken on line 6–6 of FIG. 5.
Figure 5:
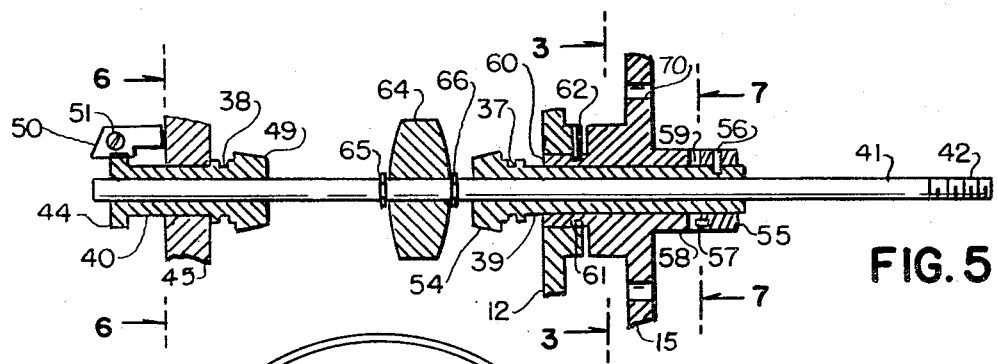
FIG. 5 is a side view of a spool shaft with fragments of a drum and other elements mounted thereon and positioned in relation thereto.

Referring further to FIGS. 2 and 5, a spool shaft 41 has a threaded forward end 42 to fix spool 17 thereon. Spool shaft 41 passes through the tubular shafts 39 and 40. Shaft 40 has a spur gear or the like 44 fixed to its rear end and shaft 40 is slidably and rotatably mounted in bearing 45 as shown in FIG. 6. Bearing 45 is fixed within drive housing 12 by screws 46. By means of pin or key 47 and the keyway 48 in shaft 41 as shown in FIG. 6, shafts 40 and 41 are constrained to rotate together. A bevel gear 49 is formed on the front end of shaft 40 as shown in FIG. 5.

As shown in FIG. 2, a blade 50 is fixed to drive casing 12 by screw 51. When shift lever 24 is in the rearward position as shown, shift yoke 30 slides shaft 40 rearwardly so that blade 50 extends between the teeth of gear 44 to engage it and prevent its rotation. This locks shaft 40 and thereby shaft 41 against rotation.

As may be further seen in FIGS. 1 and 2, crank 13 rotates a large bevel gear 52 on the far side of shift yoke 30 and shafts 41. When lever 24 is in the rearmost position, bevel gear 49, as shown in FIG. 5, is moved clear of gear 52 so that shaft 41 is locked against rotation and gear 52 may be freely revolved by crank 13.

Figure 7:
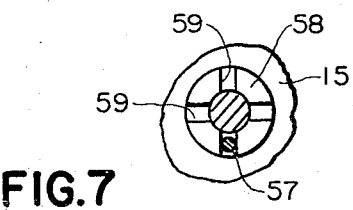
FIG. 7 is a section taken on line 7–7 of FIG. 5.

End 33 of yoke 30 holds shaft 39 rearwardly so bevel gear 54 engages gear 52. As shown in FIG. 5, shaft 39 has a collar 55 fixed by a pin 56 on its front end. A pin 57, also shown in FIG. 7, extends rearwardly from collar 55. Drum 15 is rotatably mounted in drive housing 12 about shaft 39. Drum 15 has a forwardly projecting boss 58 containing four radial slots 59, one of which is entered by pin 57 to allow shaft 39 to be rotated and drive drum 15.

Referring further to FIG. 5, drum 15 also has a rearwardly extending boss 60 which rotates within drive casing 12. Boss 60 contains an annular groove 61 entered by a pin 62 from drive casing 12 to prevent longitudinal motion of drum 15. Thus it may be seen that rotation of crank 13 turns drum 15 to operate the reel of this invention in a conventional manner.

As may be further seen in FIGS. 2 and 5, a cam follower 64 has shaft 41 rotatably pass through it. Retaining rings 65 and 66 seated in annular grooves in shaft 41 constrain shaft 41 to move longitudinally with follower 64. A well known and old internal gear mechanism (not shown) is formed in the center of gear 52 to longitudinally oscillate follower 64 and thereby shaft 41 as handle 13 is rotated. This longitudinally oscillates spool 17, which is locked against rotation, so bail 16 may evenly distribute windings of line upon it in the conventional manner.

As may be seen in FIGS. 1, 2, and 5, if shift lever 24 is moved forward to seat in the front detent notch 27', the shift yoke 30 is moved forward and slides shafts 39 and 40 forward with it. As shaft 40 moves forward, to the right as shown, bevel gear 49 engages gear 52 and the gear 44 clears blade 50 so that it allows shaft 40 to rotate freely. Thus rotation of crank 13 now drives shaft 41 by means of shaft 40 to rotate spool 17.

Figure 3:
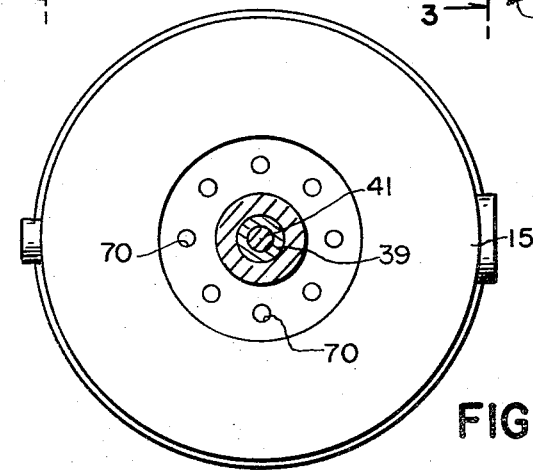
FIG. 3 is a section showing the rear end of a drum taken on line 3–3 of FIG. 5.

As shift yoke 30 moves forward, its locking bolt 31 enters one of a number of apertures 70 formed in the back of drum 15 as may be seen in FIG. 3. This locks drum 15 against rotation. The forward motion of shift yoke 30 also slides shaft 39 forward to disengage bevel gear 54 from the drive gear 52 and to disengage pin 57 from one of the radial slots 59 in boss 58 of the drum 15. Thus drum 15 is locked against rotation and disengaged from shaft 39. As shaft 41 is rotated by cranking handle 13 to rotate spool 17, follower 64 will continue to longitudinally oscillate shaft 41 and spool 17 mounted thereon to cause line passing about line guide 19 to be evenly wound on spool 17.

While this invention has been shown and described in the best form known, it will nevertheless be understood that this is purely exemplary and that modifications may be made without departing from the spirit and scope of the invention. For example, the construction of the parts shown may be varied, mechanical equivalents may be substituted, and some of the parts may be combined and consolidated.

I claim:

1. In a spinning reel having a rotatable line spool and a bail rotatable about said rotatable line spool to wind line thereon, drive means, driven means slidingly engageable with said drive means and connected to said line spool to rotate it, second driven means slidingly connected to said bail to rotate it, a control connected to said first-mentioned driven means and said second driven means to selectively and alternatively engage one of said driven means with said drive means while disengaging the other of said driven means from said drive means, and said control means operating a device to positively prevent the rotation of one of said driven means when it is disengaged from said drive means so said spool may be rotated as said bail is held stationary to wind line on said spool.

2. A device as described in claim 1 and further characterized by a stationary member positioned to engage and arrest the other of said driven means when it is disengaged from said drive means.

3. The combination according to claim 1 wherein said drive means is a bevel gear and wherein said driven means are second and third bevel gears having a common axis at right angles to the axis of said first bevel gear, said control device selectively moving said second and third bevel gears axially to engage said first bevel gear.

4. The combination according to claim 3 wherein said bail includes a rotatably mounted drum, a rotatably and slidably mounted tubular drum drive shaft having said second bevel gear mounted thereon, means connecting said drum to said tubular drum drive shaft, a central line spool shaft passing through said drum drive shaft and said drum and having said line spool mounted thereon in front of said drum, said third gear being connected to said line spool shaft, said control device sliding said drum shaft and said second gear mounted thereon rearwardly to engage said second gear with said first gear.

5. The combination according to claim 4 with the addition of a slidably mounted second tubular shaft having said third bevel gear mounted thereon, said second tubular shaft having said line spool shaft slidably pass therethrough, and means keying said second tubular shaft to rotate with said line spool shaft, said control device sliding said second tubular shaft forward to engage said third gear with said first gear.

6. The combination according to claim 5 wherein said control device is a shift yoke having two ends engaging said tubular drum drive shaft and said second tubular shaft, said shift yoke being movable to longitudinally slide said tubular shafts simultaneously.

7. The combination according to claim 6 wherein said device to prevent rotation comprises locking means on said second tubular shaft, and fixed means engaging said locking means when said second tubular shaft is slid rearwardly.

8. The combination according to claim 7 wherein said locking means on said second tubular shaft is a spur gear and wherein said fixed means is a blade which engages said spur gear when said second tubular shaft and said spur gear are moved rearwardly.

9. The combination according to claim 7 wherein said drum contains spaced apertures at a given radius and wherein said device to prevent rotation comprises a locking bolt fixed to extent forward from said shaft yoke, forward motion of said shaft lock and said locking bolt causing said locking bolt to enter a spaced aperture in said drum, locking said drum and thereby said bail against rotation.

10. The combination according to claim 9 wherein said means recited in claim 4 connecting said drum to said tubular drum drive shaft comprises a forwardly extending boss of said drum disposed about said drum drive shaft, and a collar fixed to said drum drive shaft in front of said boss, said boss and said collar having means formed thereon for mutual engagement when moved together.

11. The combination according to claim 9 with the addition of a drive housing of said reel, and a lever projecting from within said drive housing, said lever being operative to selectively slide said shift yoke to forward and rearward positions.